(12) United States Patent
Rodrigues de Lima et al.

(10) Patent No.: US 11,606,477 B2
(45) Date of Patent: Mar. 14, 2023

(54) MULTISPECTRAL CAMERA

(71) Applicant: Instituto de Pesquisas Eldorado, Campinas (BR)

(72) Inventors: Eduardo Rodrigues de Lima, Campinas (BR); Lucas Diogo de Mendonca, Campinas (BR)

(73) Assignee: Instituto de Pesquisas Eldorado, Campinas (BR)

( * ) Notice: Subject to any disclaimer, the term of this patent is extended or adjusted under 35 U.S.C. 154(b) by 245 days.

(21) Appl. No.: 17/151,228

(22) Filed: Jan. 18, 2021

(65) Prior Publication Data

US 2021/0224428 A1 Jul. 22, 2021

Related U.S. Application Data

(60) Provisional application No. 62/963,168, filed on Jan. 20, 2020.

(51) Int. Cl.
*H04N 1/44* (2006.01)
*H04N 9/09* (2006.01)
(Continued)

(52) U.S. Cl.
CPC ....... *H04N 1/4433* (2013.01); *H04N 5/23229* (2013.01); *H04N 9/09* (2013.01);
(Continued)

(58) Field of Classification Search
CPC .................................................. H04N 1/4433
(Continued)

(56) References Cited

U.S. PATENT DOCUMENTS 7,224,384 B1   5/2007   Iddan et al.
7,860,301 B2  12/2010   Se
(Continued)

FOREIGN PATENT DOCUMENTS

WO    WO 98/24065 A1    6/1998

OTHER PUBLICATIONS

Lucas Diogo de Mendonca, Eduardo Rodrigues de Lima, Cesar Giovanni Chaves, "Low-Cost Multi-Spectral Camera Platform for In-Flight Near Real-Time Vegetation Index Computation and Delivery", Anais do XVIII Simposio Brasileiro de Sensoriamento Remoto—SBSR, May 28, 2017, ISBN: 978-85-17-00088-1, Santos SP, Brazil.

*Primary Examiner* — Joel W Fosselman
(74) *Attorney, Agent, or Firm* — Andre Grouwstra

(57) ABSTRACT

A camera has two or more color elements that are removable and replaceable. The color elements may include a lens, a color filter with a filter data interface, and an image sensor. A security processor includes a private key, firmware, and has storage room for one or more vegetation indices. The security processor securely decrypts, stores, and uses the indices. Firmware checks license terms and installed filters required in a selected index, and analyzes images based on a formula in the index, thresholds for the index value, and thresholds for an object's height above ground level. A positioning receiver (e.g. GPS) determines time and position, which the firmware uses for the license check and for the height AGL calculation. Differences in camera position allow determining a parallax calculation on correlated groups of pixels. The camera provides on-the-fly analysis, and tags and stores images for which alert conditions are met.

16 Claims, 8 Drawing Sheets

(51) Int. Cl.
*H04N 5/232* (2006.01)
*G06F 8/65* (2018.01)
*G06F 21/57* (2013.01)
*H04N 1/32* (2006.01)
*H04N 9/04* (2006.01)
*H04N 101/00* (2006.01)

(52) U.S. Cl.
CPC .............. *G06F 8/65* (2013.01); *G06F 21/572* (2013.01); *G06F 2221/033* (2013.01); *H04N 1/32122* (2013.01); *H04N 1/32523* (2013.01); *H04N 1/32662* (2013.01); *H04N 9/0451* (2018.08); *H04N 2101/00* (2013.01); *H04N 2201/3246* (2013.01); *H04N 2201/3257* (2013.01)

(58) Field of Classification Search
USPC ....................................................... 348/222.1
See application file for complete search history.

(56) References Cited

U.S. PATENT DOCUMENTS

2011/0007901 A1* 1/2011 Ikeda ....................... H04B 5/02
   380/270
2019/0222779 A1 7/2019 Nelson

* cited by examiner

FIG. 1 - PRIOR ART

MULTISPECTRAL CAMERA

CROSS REFERENCES TO RELATED APPLICATIONS

This application claims priority from U.S. Provisional Patent Application Ser. No. 62/963,168, entitled Multispectral Camera, filed on Jan. 20, 2020, which is hereby incorporated by reference as if set forth in full in this application for all purposes.

BACKGROUND

The present invention is in the field of scientific and industrial cameras, in particular in the field of multispectral cameras.

When the sun directly casts its light on an object, the light contains energy over a broad spectrum of wavelengths. If the object is a perfect mirror or a perfect white body, it reflects the sun's energy for all wavelengths. If the object is a perfect black body, it absorbs the sun's energy for all wavelengths. In all other cases, the object absorbs part of the energy for each wavelength and reflects the remainder of the energy. In general, assuming an ideal source of white light, the spectrum of wavelengths that are absorbed or reflected depends partially on the materials of which the object is composed, and partially on the state of these materials. Conventionally, the spectrum has been studied with a prism, which transmits light in an angle that is dependent on the wavelength of the light.

Living beings that are gifted with vision don't perceive the fine details of the object's wavelength spectrum. For all species, the visible spectrum is limited, although some species can see different parts of the spectrum than others. Some species, including most marine mammals, do not perceive any color but only the intensity of light. Their vision is called monochromatic. Other species can discern two or more partially overlapping bands of wavelengths (colors). Their vision is called dichromatic (for two color bands), trichromatic (three color bands), or tetrachromatic (four color bands). Humans are trichromatic, mapping the spectrum into three partially overlapping bands, the peaks of which we call red, green, and blue. Whereas this is sufficient for our species' survival, a great amount of information is lost in the mapping process. Most birds are tetrachromatic. A few species can discern even more than four bands.

Conventional color photography and videography mimic the spectral sensitivity of the sensor cells in the average human eye, splitting the wavelengths into three partially overlapping bands. For many animals this would be more than necessary, as they can distinguish only two different color bands. For birds however, regular human photos and video appear bland and unnatural—missing information birds would normally consider vital.

In scientific settings, it has long been recognized that spectroscopy (the dispersion of an object's light into its component colors) can yield a wealth of information. However, spectroscopy is expensive, and no method is known to apply it affordably on a large number of simultaneous pixels that compose a full image. It is much more affordable to split the colors into a few hundred color bands (hyperspectral imaging) or into less than a few tens of color bands (multispectral imaging). The latter has become increasingly useful in commercial settings, and, for example, multispectral cameras are now routinely used in agriculture and environmental management. Multispectral cameras may be attached to airborne drones scanning or patrolling large areas of land quickly and cost-effectively. They can detect many conditions, such as unhealthy vegetation, undesired vegetation, fire, lack of water, terrain type, lack of minerals in the ground, lack of nitrogen, and others. This information helps land managers to efficiently mitigate conditions and optimize the use of resources.

The fewer color bands a camera uses, the lower its cost in terms of hardware, use of energy, and use of communication channels or memory. Therefore, a multispectral camera is in many cases more attractive and affordable than a hyperspectral camera. However, many multispectral cameras have only a fixed set of color bands and no capability to interpret the data. Thus, data is interpreted after a drone returns to its base, resulting in delays that can be costly (such as in the case of fire).

Researchers have developed many formulas to combine the relative light strengths measured in different color bands into metrics called indices that measure certain conditions. Some well-known indices are the normalized difference vegetation index (NDVI), the visible atmospherically resistant index (VARI), the transformed difference vegetation index (TDVI), the simple ratio (SR), the soil adjusted vegetation index (SAVI), the renormalized difference vegetation index (RDV), the optimized soil adjusted vegetation index (OSAVI), then non-linear index (NLI), the modified simple ratio (MSR), the modified non-linear index (MNLI), the enhanced vegetation index (EVI), the leaf area index (LAI), the green normalized difference vegetation index (GNDVI), the green ratio vegetation index (GRVI), the infrared percentage vegetation index (IPVI), and others. Many indices are in the public domain, but others are proprietary as they may represent significant economic value, or competitive advantage of camera manufacturers.

FIG. 1 illustrates a conventional multispectral camera 100. It includes a number of color elements 110. Five color elements 110A-E are drawn, which is fairly common at the time of this writing. However, cameras may have from a few to many tens of color elements 110. Each color element may include a lens 111, a color filter 112, and an image sensor 114. A camera may reverse the order of lens 111 and color filter 112. Different color elements 110 are distinguished by having their color filter 112 tuned to a different color band. For example, a current camera may have color elements 110 tuned to blue light (475 nm), green (560 nm), red (670 nm), red edge (720 nm), and near infrared (840 nm). In this case, each of the image sensors may be a monochromatic sensor that, without color filter 112, is capable of capturing the light of any wavelength within at least the band of interest. Another current camera may include four color elements 110, each tuned to a wavelength band of interest, and a fifth color element that may have no color filter 112, and a color image sensor delivering an RGB image.

Color elements 110A-E deliver digitized images to processor 120, which may store these images in memory 130 and/or transmit them via transmitter 140 when a suitable receiver is within range. Memory 130 may be a flash memory, another non-volatile memory (NVM), or a random-access memory (RAM) capable of storing a large amount of data inexpensively. Transmitter 140 may use a popular standard such as WiFi or Bluetooth to easily communicate with a computer or handheld device. In addition, a camera may provide wired communication port, such as USB. Although in most commercial cameras the color bands are fixed, U.S. patent publication 2019/0222779 by Ryan Lee Nelson discloses a swappable filter cartridge that allows easily changing a camera's characteristics. The cartridge includes filters that are placed in front of the lenses, and an interface that may be used for communicating optical configuration data, including filter characteristics.

Today, multispectral cameras are becoming more affordable, but they have several drawbacks. One drawback is that an owner of a proprietary index may not easily and flexibly provide the index without risking that it is copied or hacked, or otherwise exposed. For example, current cameras may not support providing a short-term license to an index without exposing the index. A further drawback is that a proprietary index may require a non-standard filter set, which is not always available on a camera. Without verifying that the correct or acceptable filters are installed, an index may deliver inaccurate or wrong results. A yet further problem, especially when a camera is looking down from a drone, is that it may not be able to distinguish between vegetation of interest (for example, a crop) and vegetation that may be lower to the ground (for example, ground cover) or higher than the crop of interest (for example, a tree). Thus, conventional cameras don't support the use of high-quality or proprietary indices, and may be limited in supporting various business models.

SUMMARY

The spectrum of light reflected by an object provides information about the object's composition and state. Human vision maps the color spectrum onto three partially overlapping bands of red, green, and blue. Although this allows us to easily distinguish a tree that is on fire from a healthy tree, it may be more difficult to distinguish an unhealthy tree from a healthy tree. If we could discern additional and more relevant color bands, we would more easily distinguish between these conditions. Similarly, if the video and photo cameras that we use could distinguish between additional and more relevant color bands, we could more easily detect desirable and undesirable conditions from the resulting images. Current multispectral cameras can do this, but they don't support high-quality proprietary indices that may need to be delivered in flexible business models. Embodiments of the invention provide cameras and methods that fix this deficiency.

In a first aspect, an embodiment provides a camera with two or more color elements. The color elements may be removable and replaceable. Each color element includes a lens, a color filter, a filter data interface, and an image sensor. The camera has a security processor that inaccessibly stores a private key and firmware, and that can store at least one index. It further includes a positioning receiver (for example, GPS) and a transceiver (for example, WiFi). The firmware includes instructions to combine images from the image sensors, to calculate an index value for pixels in the combined image, and to determine if an alert must be issued. If so, the camera issues an alert when a connection is available.

In an embodiment, the firmware further receives and decrypts an index in the security processor, and stores it in an NVM in the security processor. It obtains a time and date from the positioning receives, and determines if the time and date meet license terms included in the index. It also determines if the correct or acceptable filters have been installed for the index. If the license terms are met and the installed filters are at least acceptable, the firmware allows use of the index.

In a further embodiment, the firmware captures two images and camera positions related to the two images. It determines a motion distance and direction between the camera positions. It selects groups of adjacent pixels with similar colors or features in the first image, and finds a two-dimensional shift by correlating pixels in the second image with pixels in the first image. Due to parallax, the firmware can now calculate a distance from the camera, and it can calculate a distance above ground level. The firmware estimates the camera's height above ground level (AGL) by measuring it with a distance meter or by interpolating between calculated points of maximum distance from the camera. With this, the camera can calculate the pixel group's height AGL and determine if it meets a height condition set by the user, or default and included in the index. If index value conditions and height AGL conditions are met, the firmware tags and stores the first image and/or the second image, and issues an alarm to the user.

In a second aspect, an embodiment provides a security processor with the above firmware.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which.

DETAILED DESCRIPTION

Figure 1:
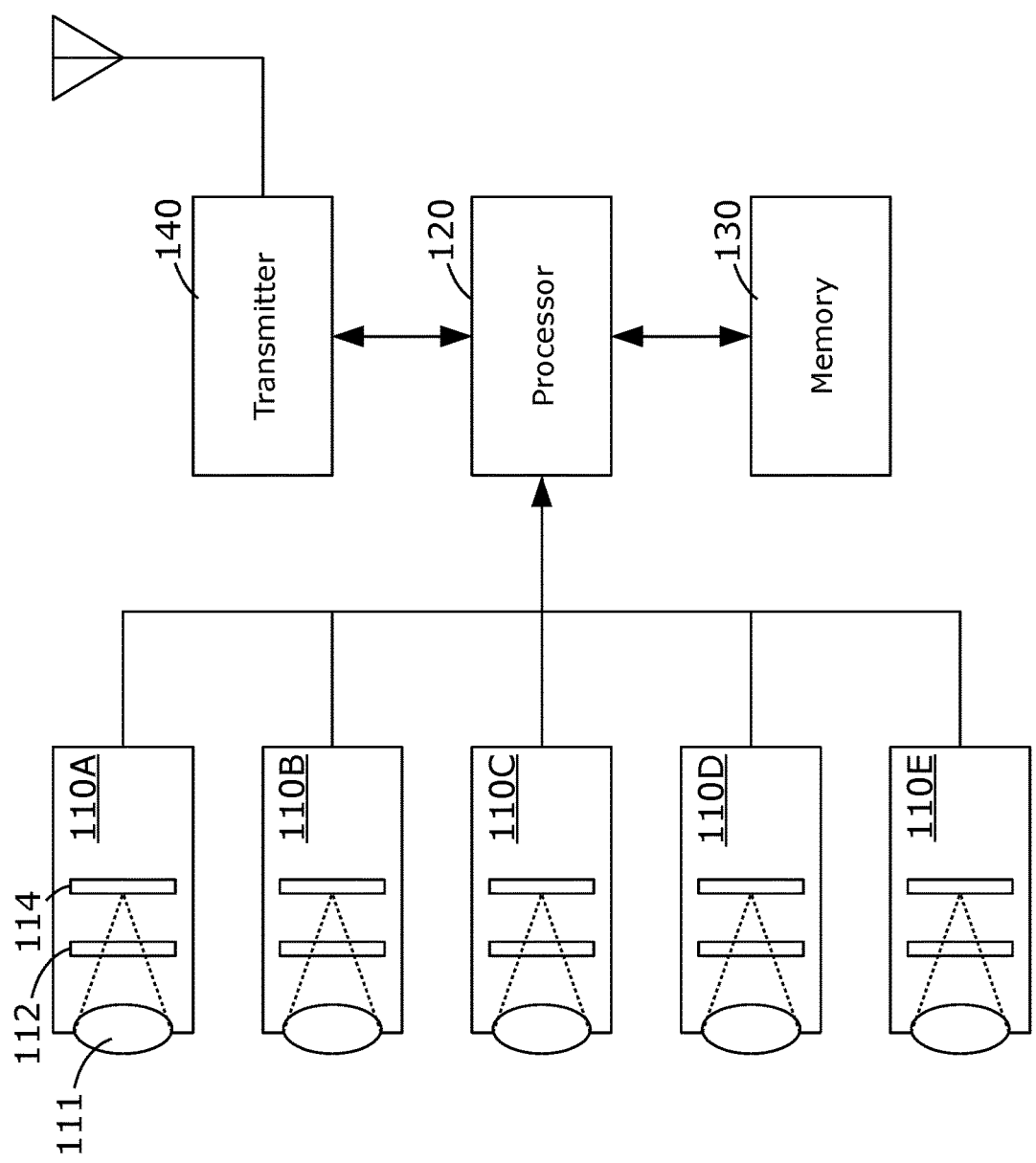
FIG. 1 illustrates a conventional multispectral camera.

The spectrum of light reflected by an object provides information about the object's composition and state. Human vision maps the color spectrum onto three partially overlapping bands of red, green, and blue. Although this allows us to easily distinguish a tree that is on fire from a healthy tree, it may be more difficult to distinguish an unhealthy tree from a healthy tree. If we could discern additional and more relevant color bands, we would more easily distinguish between these conditions. Similarly, if the video and photo cameras that we use could distinguish between additional and more relevant color bands, we could more easily detect desirable and undesirable conditions from the resulting images. Current multispectral cameras can do this, but they don't support high-quality proprietary indices that may need to be delivered in flexible business models. Embodiments of the invention provide cameras and methods that fix this deficiency. To understand the context for the invention, it is helpful to understand how various stakeholders may work and interact. FIGS. 2-5 provide this context in the form of example stakeholder workflows.

An index, as used by embodiments, may be proprietary—in which case it is likely to be encrypted—or in the public domain. In normal embodiments, the index may include the following information:

Name of the index
Ownership
License term—start date, end date, and any other limitations to using the index
Correct filter identifications
Allowable filter specifications
Formula to calculate the index value based on pixel color values in the different bands
Minimum height above ground level (AGL) (may be overridden by user settings on the camera)
Maximum height AGL (may be overridden by user settings on the camera)
Thresholds
  Threshold level (may be overridden by user settings on the camera). An image meets an index condition if for a group of pixels the index value exceeds a maximum threshold or doesn't meet a minimum threshold, and an estimated height AGL is at least the minimum height AGL and no more than the maximum height AGL.
  Threshold type: minimum or maximum threshold; threshold for the index value, threshold per band, combination of bands, or any combination that fits a logical function.

An example formula to calculate the NDVI index value is:

value=(NIR−Red)/(NIR+Red), see J. W. Rouse Jr., R. N. Haas, J. A. Schell, and D. W. Deering, *Monitoring Vegetation Systems in the Great Plains with ERTS*, Third ERTS Symposium, NASA (1973): 309-317. Rouse et al. use the colors of "bands 5 and 7" of the multispectral camera in the Landsat 1 satellite, here denoted as Red and NIR (near-infrared).

An example decrypted/unencrypted index is:
index {
　"name"="NDVI",
　"owner"="NASA",
　license {
　　"type"="public",
　　"start"="none",
　　"end"="none"
　},
　filter {
　　"secret"="no",
　　"name"="red",
　　"type"="bandpass",
　　"comment"="MSS band 5",
　　"filter id"="R39092",
　　"peak_wavelength"="650 nm",
　　"lower_wavelength"="600 nm",
　　"higher_wavelength"="700 nm"
　},
　filter {
　　"secret"="no",
　　"name"="NIR",
　　"type"="bandpass",
　　"comment"="MSS band 7",
　　"filter id"="NIR39094",
　　"peak_wavelength"="950 nm",
　　"lower_wavelength"="800 nm",
　　"higher_wavelength"="1100 nm"
　},
　value {
　　"formula"="(NIR−Red)/(NIR+Red)",
　　"secret"="yes"
　}
　"default_min_height_AGL"="0 m",
　"default_max_height_AGL"="5m",
　alert {
　　"name"="dummy",
　　"type"="none",
　　"default_min_threshold"=none",
　　"default_max_threshold"=none"
　}
}

Any section of an index may be secret. In the above example, both filter sections include a key-value pair "secret"="no", indicating that the filters are not secret, whereas the value section includes a key-value pair "secret"="yes", indicating that the index formula must not be disclosed.

Figure 2:
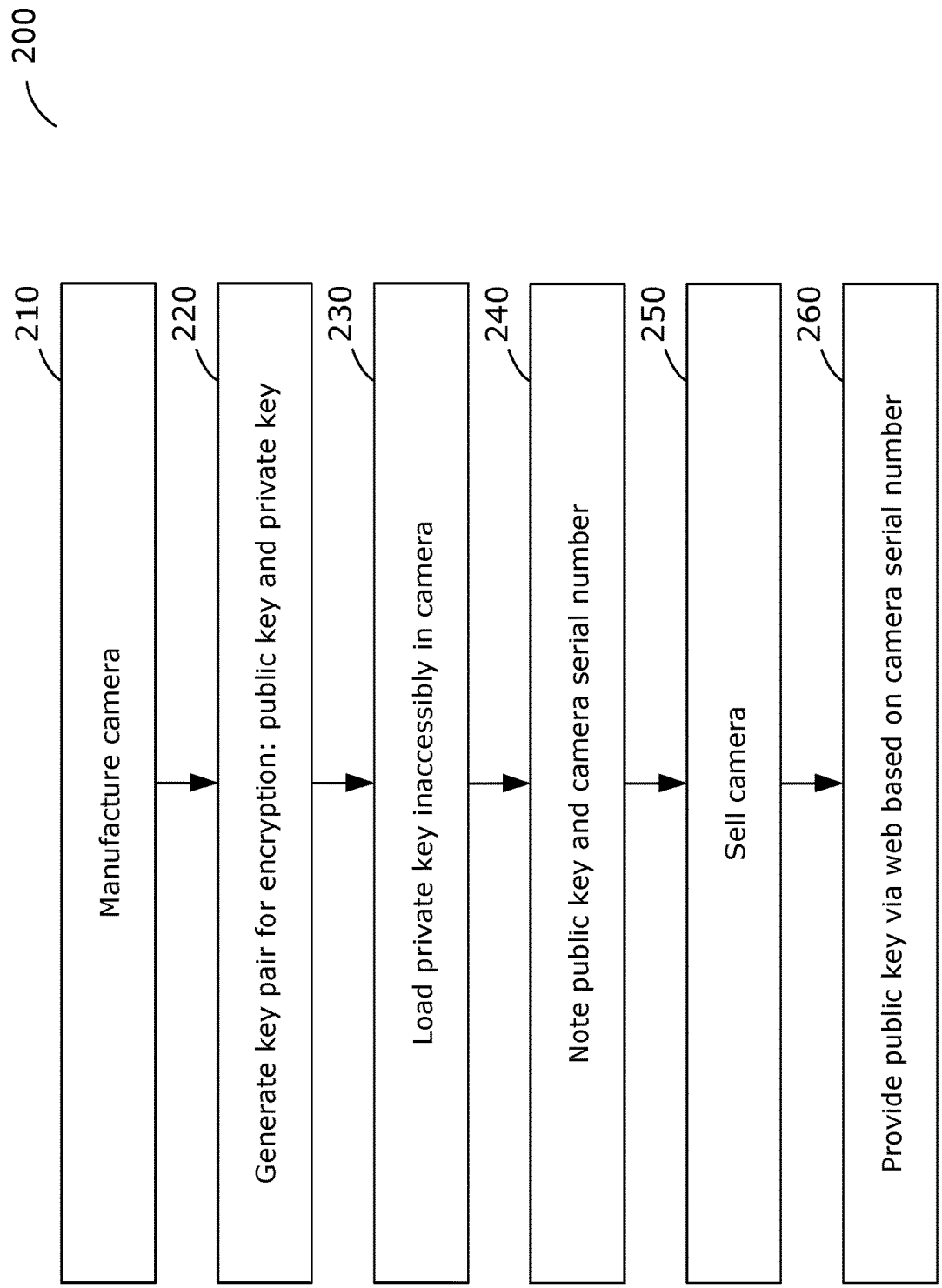
FIG. 2 illustrates an example workflow for a camera manufacturer.

FIG. 2 illustrates an example workflow 200 for a camera manufacturer. Workflow 200 comprises the following steps.

Step 210—Manufacturing a camera. The camera supports the methods described herein, and will be described in more detail with reference to FIG. 6. In particular, the camera is capable of securely and inaccessibly storing an encryption key.

Step 220—Generating an encryption key pair for asymmetric encryption. The key pair includes a public key and a private key.

Step 230—Loading the private key inaccessibly into the camera. Since the key is in no way directly accessible, the only way to verify that this step has succeeded is by encrypting a test code with the public key, loading the encrypted test code into the camera, and obtaining a confirmation from the camera that the encryption succeeded.

Step 240—Noting and remembering the public key with the camera's serial number. The camera manufacturer deletes the private key and does not keep any copy of the private key.

Step 250—Selling the camera. The manufacturer informs the owner of the camera's serial number.

Although the manufacturer may inform the camera owner of the public key, the camera owner does not obtain the private key. Neither key is directly important for the camera owner. To be able to license an index, he or she needs to know the camera's serial number. An index owner will (should) not trust a public key provided by a camera owner, to avoid a "man-in-the-middle" hack that results in exposure of the index.

Step 260—Providing the public key via Internet, for instance via the manufacturer's website, in response to any query that provides a valid camera serial number. The camera manufacturer acts as a trusted third party between the camera owner and any provider of commercial indices. Since the camera manufacturer is a neutral party in a license sale, the camera manufacturer never gets the index. A camera manufacturer that is found breaking the index owners' trust will lose a lot of camera sales, as commercial index owners will be likely to stop licensing their indices for cameras of the fraudulent brand.

Figure 3:
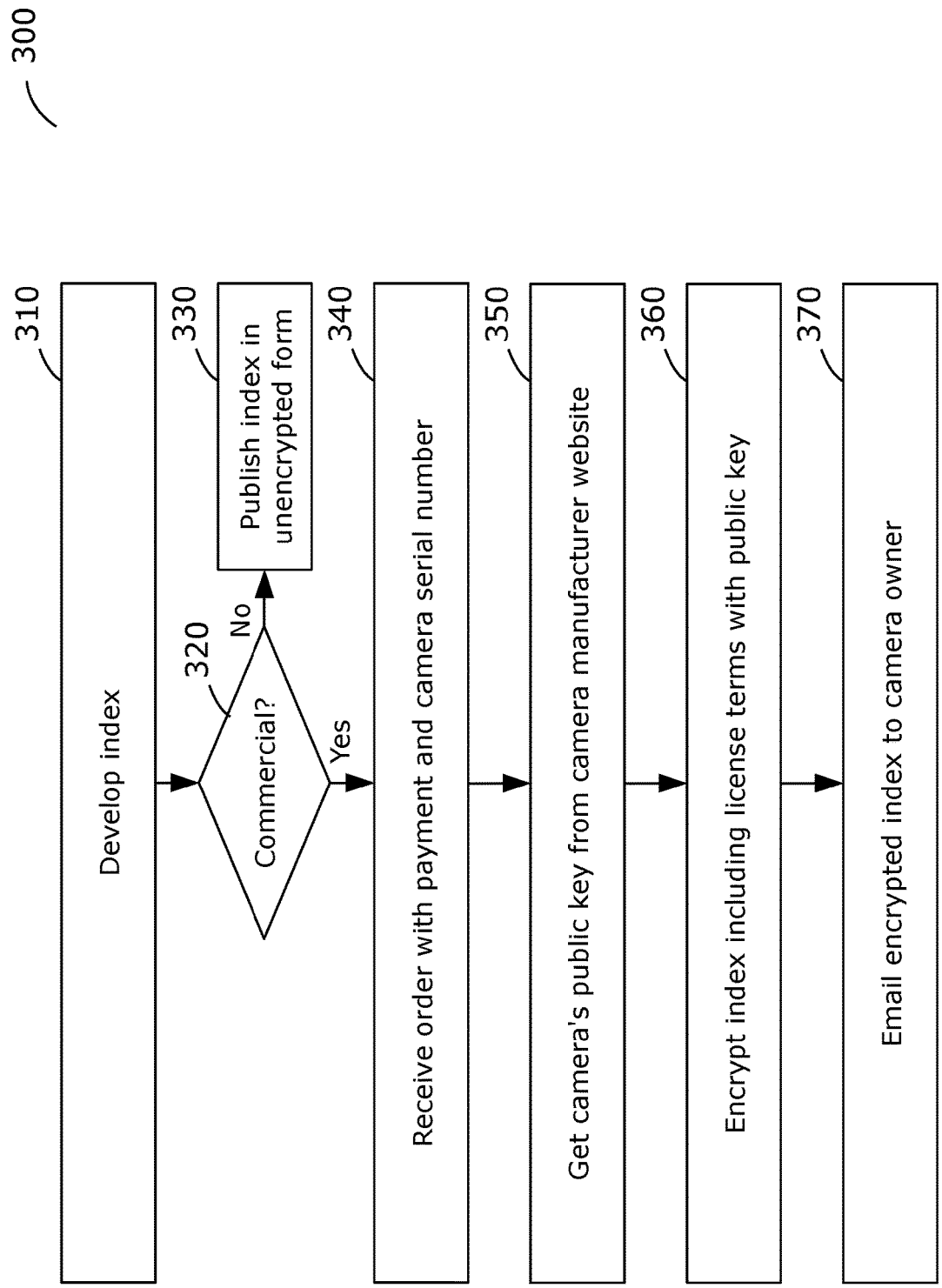
FIG. 3 illustrates an example workflow for an index developer.

FIG. 3 illustrates an example workflow 300 for an index developer. Workflow 300 comprises the following steps.

Step 310—developing an index. This step can require extensive research, and may therefore be costly. A commercial index developer likely plans to earn back the investment.

Step 320—determining if the index is commercial. If not, proceed with Step 330, else proceed with Step 340.

Step 330—if the index is not commercial, publishing the index in unencrypted form.

Step 340—if the index is commercial, then finding a customer, and receiving an order with payment and a camera serial number. The serial number uniquely identifies the camera, and is therefore tied to the camera's encryption keys.

Step 350—getting the camera's public key from the camera manufacturer's website.

Step 360—including the customer's license terms in the index, and encrypting the index with the camera's public key. The license terms include the license start date and the license end date, if applicable.

Step 370—emailing the encrypted index to the camera owner. Since the encrypted index is only legible for the camera of which the serial number was provided, the index is securely protected and will not suffer from the vulnerabilities tied to normal email. The camera owner has no path to reading or copying a decrypted version of the index, but may use the index as long as it is loaded into the camera and the terms of the license are not exceeded.

Figure 4:
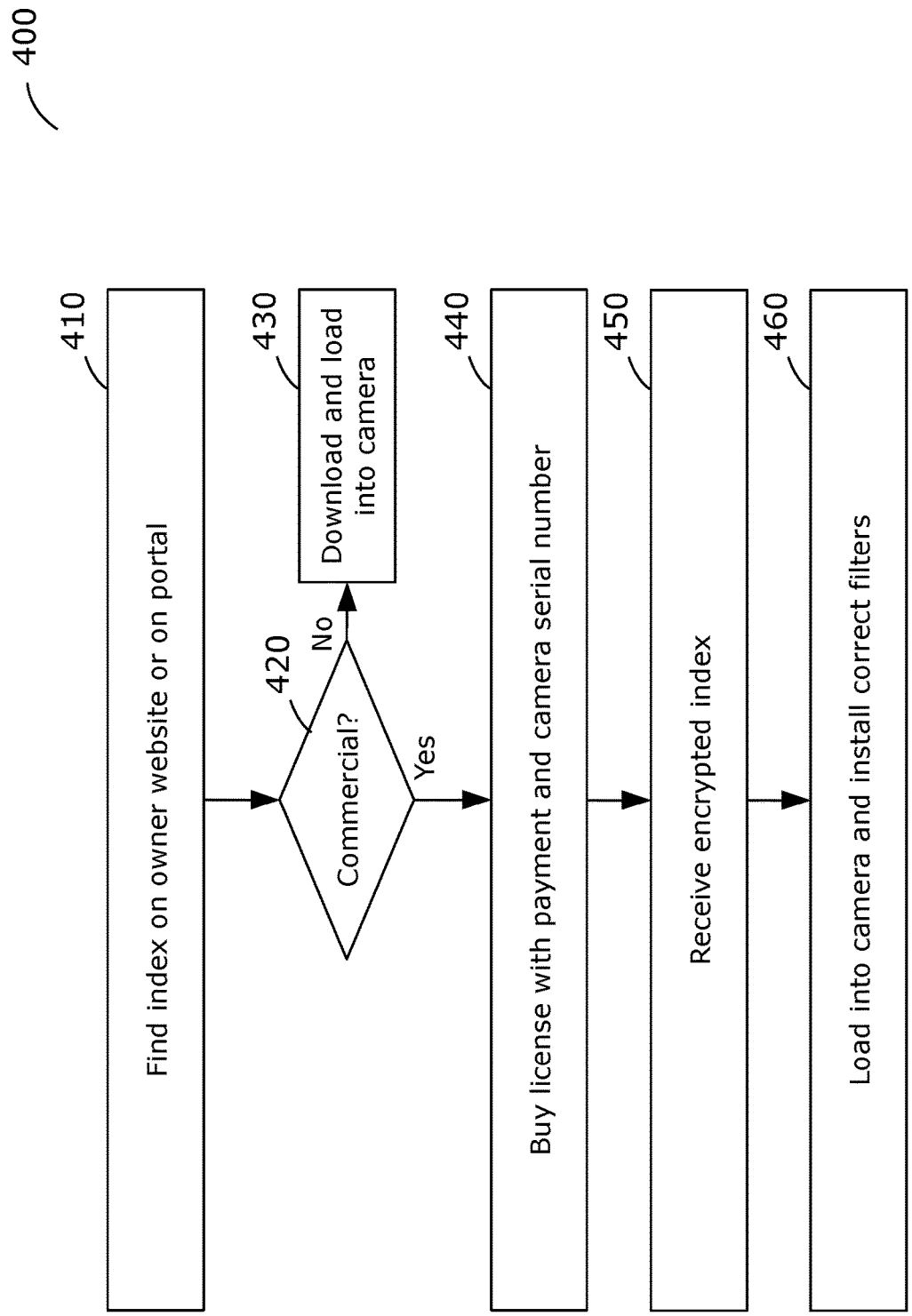
FIG. 4 illustrates an example workflow for a camera owner.

FIG. 4 illustrates an example workflow 400 for a camera owner. Workflow 400 comprises the following steps.

Step 410—finding an index on an index owner website or on an index portal.

Step 420—determining if the index is commercial, or rather, if it is encrypted. If the index is not in the public domain, then it is likely encrypted. If it is in the public domain, it may not be encrypted.

Step 430—upon determining that the index is not commercial (not encrypted), downloading the index, loading it into the camera and installing any required filters. At this point, the camera owner may start using the index.

Step 440—upon determining that the index is commercial (i.e., encrypted), purchasing a license by sending the index owner a required payment and the camera's serial number. The index owner is likely to respond by executing Step 340 through Step 370 as described with reference to FIG. 3.

Step 450—receiving the index in encrypted form. The index can only be decrypted by the camera whose serial number was provided in Step 440. The index includes information about the license term, as well as required filters.

Step 460—loading the encrypted index into the camera, and installing any required filters. The camera owner may use the index during the license term.

Figure 5:
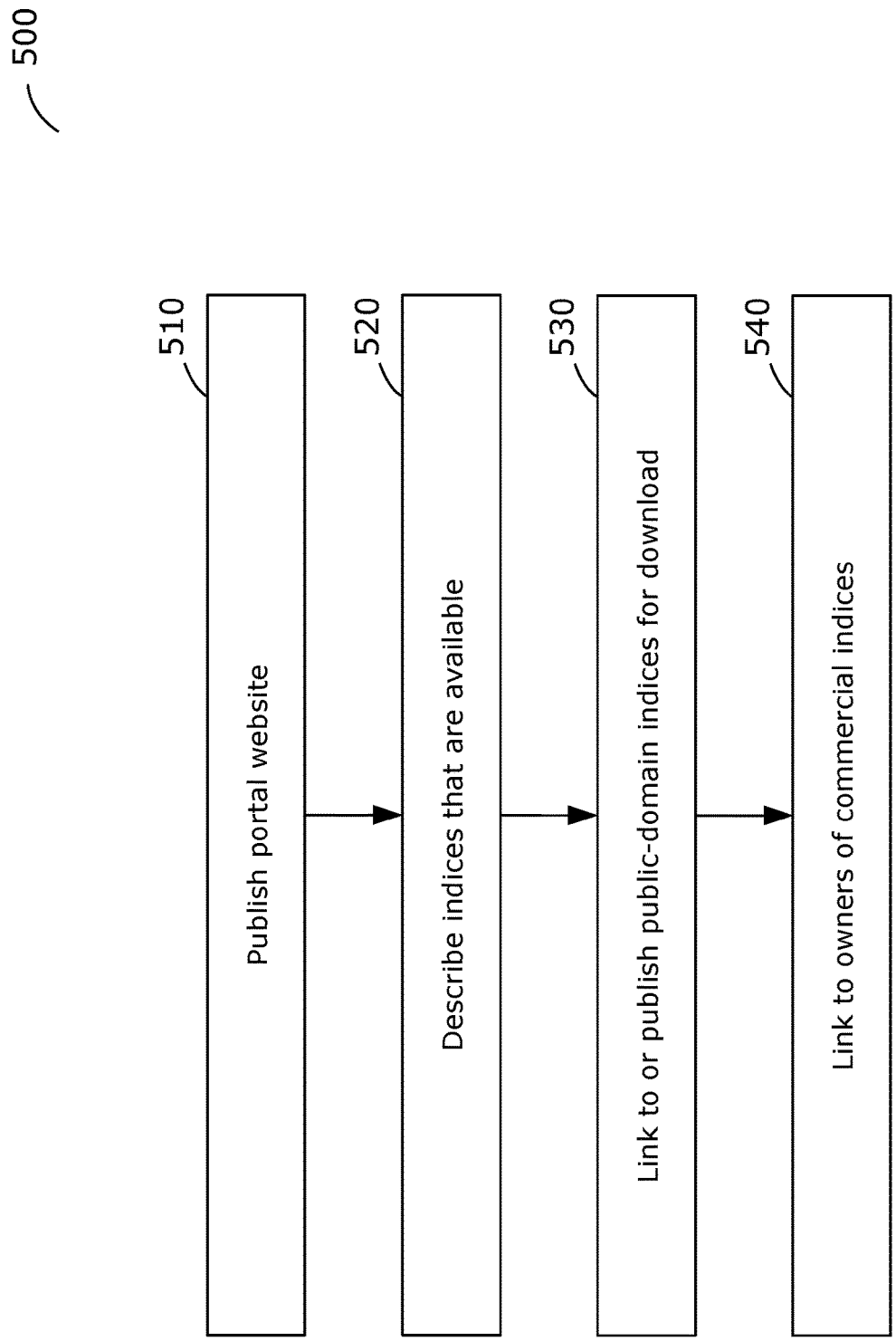
FIG. 5 illustrates an example workflow for an index portal owner.

FIG. 5 illustrates an example workflow 500 for an index portal owner. Workflow 500 comprises the following steps.

Step 510—publishing a portal website. The portal website may list commercial and public-domain indices for one or more types of multispectral cameras. The portal offers index owners a convenient place to promote their indices to prospective users, and it owns camera owners a convenient place to search for any required indices. The index portal owner may be a camera manufacturer, or a neutral third party.

Step 520—describe indices that are available. An advantage of a portal website is that it can streamline information by standardizing index descriptions. Another advantage is that it can collect and publish user reviews, which provides a communication channel back to index owners about users' field experiences.

Step 530—linking listed public-domain indices to index owners' websites and/or publishing public-domain indices for direct download.

Step 540—linking listed commercial indices to index owners' websites. This allows a camera user to connect to an index owner's website and purchase the index directly from the index owner.

Figure 6:
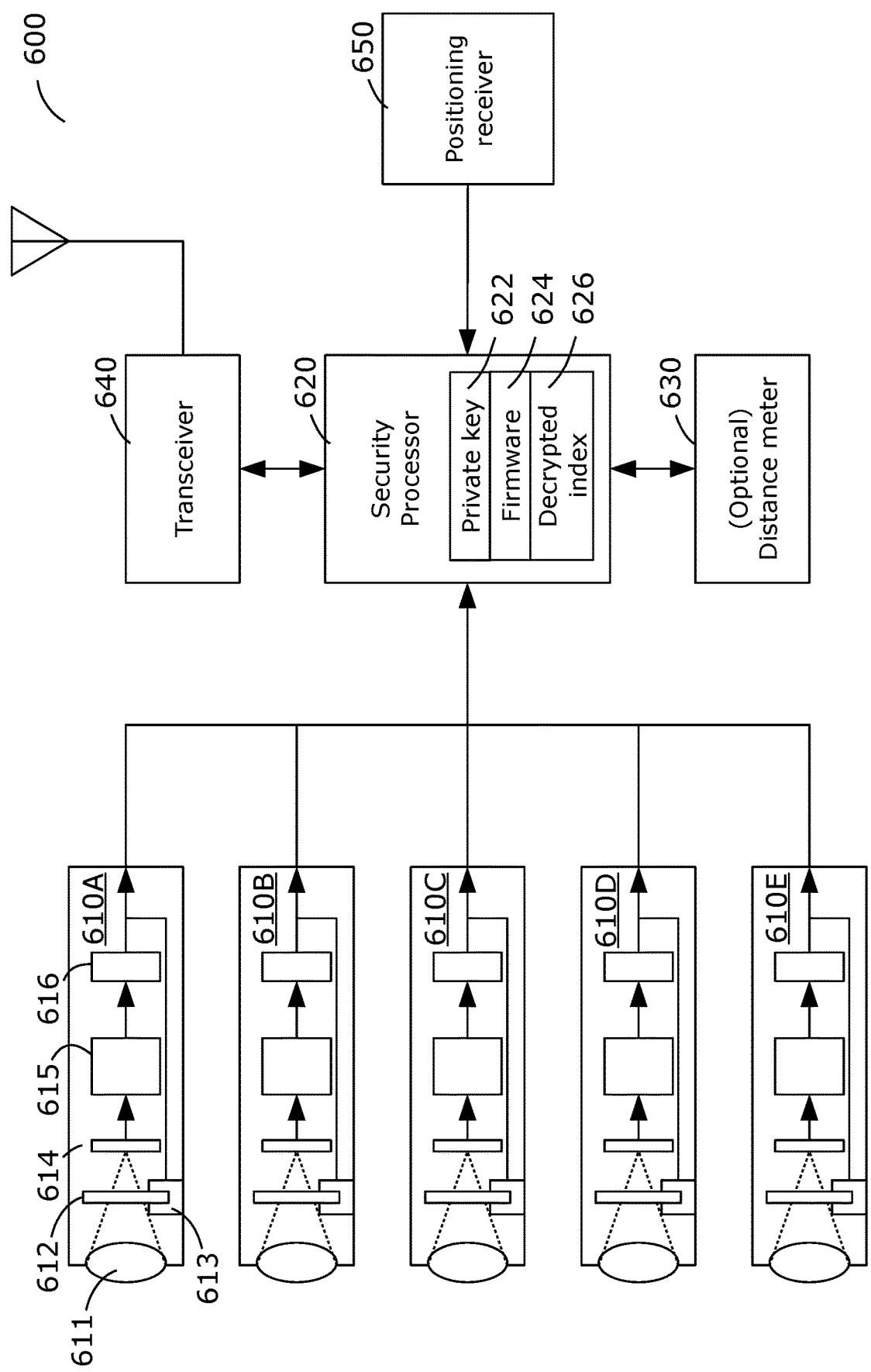
FIG. 6 illustrates an example multispectral camera according to an embodiment of the invention.

FIG. 6 illustrates an example camera 600 according to an embodiment of the invention. The camera includes two or more color elements 610 (color elements 610A-E are drawn), each including a lens 611, a color filter 612, an filter data interface 613, an image sensor 614, an optional local processor 615, and an optional local memory 616. The order of the lens 611 and color filter 612 may be as shown, or reversed. In some embodiments, color filter 612 with its filter data interface 613 is detachable and replaceable. In other embodiments, a combination of lens 611, color filter 612 and filter data interface 613, or another combination of the components in color elements 610 may be detachable and replaceable. A color element captures a scene through its lens 611, uses its color filter 612 to filter out one or more parts of the color spectrum to obtain a filtered image, exposes the image sensor 614 to the filtered image to obtain an electronic version of the filtered image, processes the result in optional local processor 615 in accordance with methods described herein, and stores the result in optional local memory 616. The camera processes the stored results from all color elements, identified by information provided through each color element's filter data interface 613, in security processor 620 to obtain a combined image and to calculate an index value for pixels in the combined image, and to determine if an alert must be generated. In embodiments that do not provide optional local processor 615 and optional local memory 616, security processor 620 performs tasks otherwise performed by optional local processor 615, and may use a shared memory (not drawn) to replace the instances of optional local memory 616.

As mentioned above, the order of lens 611 and color filter 612 may be reversed. Some embodiments may provide a set of fixed lenses 211, and allow inserting color filters 212 between lens 611 and image sensor 614 or placing color filter 612 in front of (outside) lens 611. The latter has the potential advantage of allowing protection of image sensor 614 and other electronics from dust and water. Through filter data interface 613, each color filter 612 identifies itself to security processor 620, and/or provides filter specifications that may include, for example, whether the filter has a passband, stopband, low-pass or high-pass functionality, and wavelengths for the peak or center of a passband or stopband, and the bandlimit wavelengths. In some embodiments, filter data interface 613 uses a wired interface with color filter 612. In other embodiments, filter data interface 613 uses an electromagnetic field to communicate data about the filter. For example, an embodiment may use a transformer with physically separate coils to communicate data, or it may use radio-frequency identification (RFID) or near-field communication (NFC). Filter data may be encrypted.

Security processor 620 distinguishes itself from regular processors by providing protection against tampering. Security processor 620 includes non-volatile memory (NVM) or other non-transitory memory for a private key 622, firmware 624, and at least one decrypted index 626. Security processor 620 protects the private key 622 from external reading, and uses it to decrypt private messages and indices. The NVM cannot be read externally, i.e. it is not possible to provide security processor 620 a command that will expose any content of the NVM to the security processor 620 external connections (including data pins, debug pins, and production test pins, and including any bondpads, whether externally connected or not). In a production test, the value of private key 622 can only be tested indirectly by encrypting a test code with the public key, and functionally testing whether security processor 620 correctly decodes the test code. In some embodiments, security processor 620 allows modifying private key 622 only with the use of a manufacturer-provided password, which may be a one-time password (OTP). Although it is possible for a camera owner to provide the camera with updated firmware 624, this updated firmware 624 must be encrypted, such that security processor 620 decrypts and authenticates it before installing it in the NVM. Security processor 620 does not accept unauthenticated firmware or private keys, and therefore, in practical situations only the camera manufacturer is capable of providing firmware changes and updates or modifications to private key 622. For example, authentication could be achieved through a password (also in NVM, in read-only memory (ROM), or dynamically changing) that would be kept secret by the camera manufacturer. The NVM has room for at least one decrypted index 626. Whereas firmware 624 accepts commands to store or remove an index (which may be encrypted or open), it will not allow reading the full index. However, firmware 624 may accept that a user reads limited parts of an index, such as its name, owner, license terms, or the filter requirements. Security processor 620 may have any further features known in the art to deter tampering, theft, and substitution. For example, it may not reveal executable instructions and it may include an internal real-time clock (RTC) to detect tampering with time information provided by a GPS module.

Camera 600 further comprises a transceiver 640, a positioning receiver 650, and an optional distance meter 630. Transceiver 640 may transmit and receive data via a popular protocol such as WiFi (IEEE 802.11), Bluetooth, Zigbee (IEEE 802.15.4), Wi-SUN (IEEE 802.15.4g), LoRa, or any other standard or non-standard protocol that provides data connections. Some embodiments may provide a wired connection instead of or in addition to a wireless connection, and operate with a suitable wired protocol, for example universal serial bus (USB). An embodiment uses transceiver 640 to send information and alerts to a remotely located user, and also to receive information, such as an encrypted index, a public-domain index, or a user command.

Positioning receiver 650 is configured to provide security processor 620 with position and time information, received from a satellite-based positioning system such as global positioning system (GPS), global navigation satellite system (GLONASS), Galileo, or Beidou, and/or received from an earth-based positioning system. The optional distance meter 630 is an instrument such as a laser rangefinder or a sonar that is capable of accurately measuring a distance. For example, when camera 600 is mounted below a drone, it may measure the distance between camera 600 and the ground below. The instrument is optional, because some embodiments estimate ground distance directly from images captured with color elements 610.

Embodiments provide flexibility for working with an unlimited number of indices via the use of security processor 620 and the filter data interfaces of the color elements 610. A user may upload an index to security processor 620. The index may be encrypted with a public key that is specific to security processor 620, such that security processor 620 is uniquely capable of decrypting the index and storing the decrypted index 626 inside security processor 620. Upon storing and, if required, decrypting the index, security processor 620 checks a filter identification for each installed color filter 612 provided through its filter data interface 613, and determines if camera 600 is configured with a correct set of filters to use the index. Some embodiments determine from a non-optimal set of filters whether it may still be marginally usable by comparing installed filter specifications with required filter specification, for example based on a peak wavelength, a lower-wavelength, and a higher-wavelength. If, for example, four out of five filters required for the index are present, but the fifth filter does not have an identification required by the index, then the fifth filter may still be usable for the index if its specifications fall within an acceptable range specified by the index.

Some embodiments may further include a card reader (not drawn), connected with the security processor. The card reader allows loading secure data, encrypted and authenticating itself, to be loaded into the security processor. The secure data could include a private key update, a manufacturer password update, a firmware update, and any number of encrypted indices. The card reader could take handle all secure data, allowing the transceiver to transmit non-sensitive data only.

Figure 7:
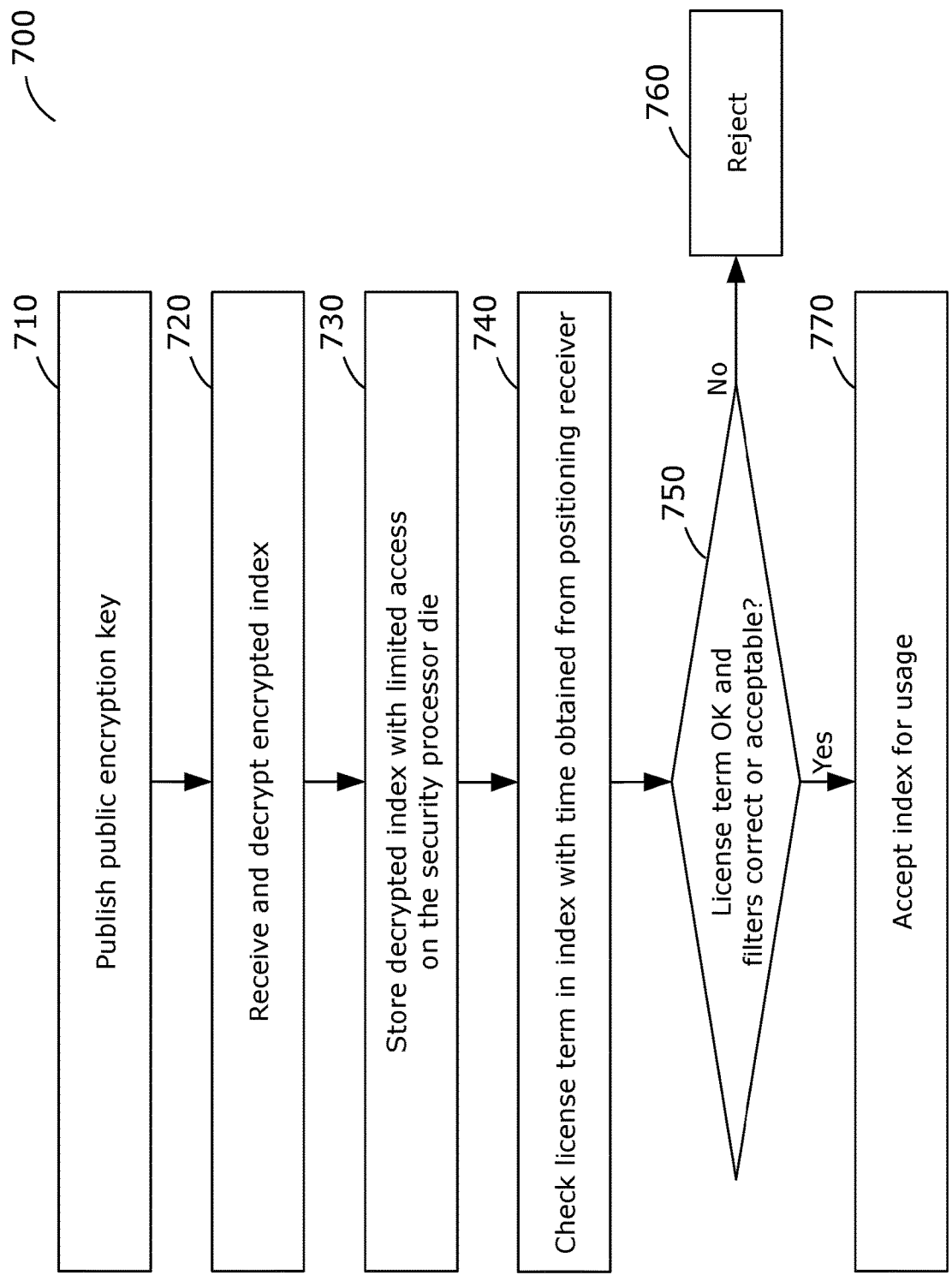
FIG. 7 illustrates a method of securely operating a multispectral camera with a proprietary index according to an embodiment of the invention.

FIG. 7 illustrates a method 700 of securely operating a camera with an index according to an embodiment of the invention. The index may be proprietary, and therefore provided to the camera in encrypted format. Method 700 comprises the following steps.

Step 710—reporting an encryption key to an index owner. The encryption key is unique and specific to the camera. For embodiments that use asymmetric encryption, the encryption key may be a public key, for example provided and published or confirmed by the camera manufacturer. Assuming that the camera manufacturer is a trusted party, this prevents the camera owner to act as a man-in-the-middle and obtain the possibility to provide a false key, decrypt the index, and re-encrypt it with the proper key. Embodiments that use symmetric encryption may use another secure channel, such as a virtual private network (VPN), directly between the camera and the index owner to securely transmit the encryption key. The index owner can proceed and encrypt the index with the encryption key.

Step 720—receiving and decrypting the index in a security processor. The camera receives the encrypted index. It stores a decryption key inaccessibly in a non-volatile memory (NVM) or read-only memory (ROM) inside the security processor, with which it decrypts the index. In embodiments, the decryption key is a private key.

Step 730—storing the decrypted index with limited access in the NVM. An ordinary user can access the NVM to store or remove one or more indices, but cannot read an index or the decryption key. An embodiment poses elevated access authorization requirements for such types of action. Some embodiments may store public-domain indices in the NVM, or in an external memory such as a flash or RAM memory.

Step 740—obtaining a time and date from a positioning receiver (such as a GPS receiver) and determining if the time and date meet a license term stored in the index.

Step 750—if the time and date meet the license term stored in the index, determining if the camera has sufficient filters configured that have the correct identification or at least acceptable filter specifications for the index. The index may specify a set of required filters, and for each required filter it may specify correct filter identifications; acceptable filter identifications; and/or acceptable filter specifications such as (1) filter type (passband, stopband, low-pass, high-pass, or other); (2) acceptable peak wavelength range; (3) acceptable lower wavelength range; (4) acceptable higher wavelength range; and any other relevant parameters. The lower wavelength and higher wavelength may be wavelengths for which the filter transmits 3 dB less energy (passband filter) or 3 dB more energy (stopband filter) than for the peak wavelength. The embodiment reads from the filter data interface of each color filter its filter identification and/or its filter specifications, and determines if (i) the filter identification is correct; (ii) the filter identification is acceptable; or (iii) the filter specifications are acceptable.

Step 760—upon determining that the time and date do not meet the license term stored in the index or that the camera does not have sufficient filters configured that are correct or at least acceptable for the index, rejecting use of the index. An embodiment may alert a user via a displayed message, or via a message forwarded through its transmitter or wired interface. Some embodiments may play an audio alert (beeps) or light an LED. Other embodiments may fail to give a confirmation message.

Step 770—upon determining that the time and date do meet the license term stored in the index and that the camera does have sufficient filters configured that are correct or at least acceptable for the index, accepting usage of the index. Usage, in this context, means using the index to determine if a group of pixels in an image captured by the camera meets a condition specified in the index, i.e. if the index value calculated for the group of pixels exceeds an alert level. An embodiment may provide real-time interpretation of camera data with immediate alerts for meeting or not meeting the condition. The security processor executes a formula with a condition included in the index to determine for a pixel or for a group of closely located pixels whether the pixel data meets the condition. If the pixel data meets the condition, the embodiment issues an alert to the user via its transceiver. Interpreting the camera data inside the camera and only transmitting information when there is an alert greatly reduces the amount of data to be transmitted. This saves battery life, and allows the camera to operate within legal constraints of radio-frequency communication by lowering its average transmission power. Yet, it allows the user to immediately become aware of conditions, and receive limited background information that may include the camera's location, a still image of the terrain that caused the alert, a timestamp, an estimate of the reliability of the alert, and other low-bandwidth data of immediate interest. The embodiment may determine the reliability of the alert from the filter combination (are all filters correct, or are some filters incorrect but acceptable?) and from factors that may impact the signal-to-noise ratio of the image data. For example, a single pixel meeting the index condition may just be an artifact of noise, whereas a large area of pixels meeting the index condition gives a large confidence that the alert is true.

Figure 8:
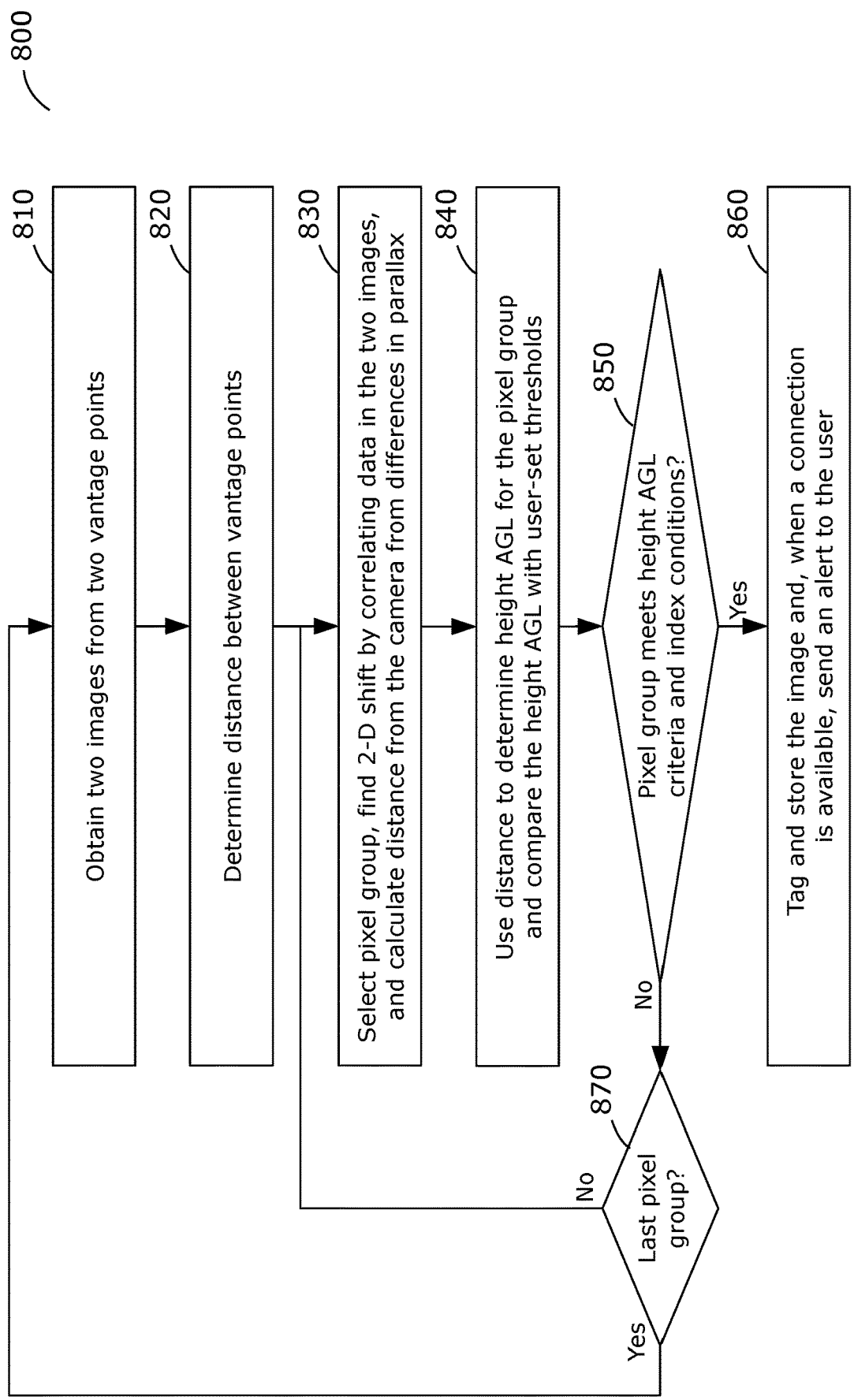
FIG. 8 illustrates a method for alerting about a condition according to an embodiment of the invention.

FIG. 8 illustrates a method 800 for a camera to alert about an index condition according to an embodiment of the invention. The method uses a camera as described with reference to FIG. 6. The camera may be mounted on a flying drone. The camera captures images with two or more color planes, i.e. two or more fields with intensity data for the pixels in the images, each color plane relating to images obtained using a specific color filter. Additionally, the camera has a memory for storing a depth plane, i.e. a "color" plane used for storing depth information for the pixels in the captured images. Method 800 comprises the following steps.

Step 810—capturing a first and a second image from two separate vantage points, and obtaining a first time of capturing related to the first image and a second time of capturing related to the second image as well as a first camera position related to the first time of capturing and a second camera position related to the second time of capturing. An embodiment may simultaneously capture the first image from one or more image sensors and the first time of capturing and the first camera position from the positioning receiver. It may then simultaneously capture the second image from the one or more image sensors and the second time of capturing and the second camera position from the positioning system receiver.

Step 820—based on a difference between the second camera position and the first camera position, determining a distance and direction between the two vantage points. If a drone carrying the camera has flown from the first camera position to the second camera position, the two vantage points will result in differences between the first image and the second image. Due to parallax, these differences will be small for objects in the two images that are far away from the camera, and large for objects that are close to the camera. The differences will be noticeable as a two-dimensional shift of an object in the images in the direction opposite to the direction between the two vantage points.

Step 830—selecting a group of adjacent pixels with similar colors in the first image, and finding a two-dimensional shift of the group of pixels by correlating pixel colors in the second image with pixel colors in the first image, in a direction opposite to the direction between the two vantage points. The two-dimensional shift is found for a shift value where the correlation between the first and second image is highest. The embodiment proceeds by calculating a distance from the camera based on the size of the two-dimensional shift. Having similar colors, the group of pixels has a high probability of relating to the same object being captured in the two images, therefore the distance from the camera has a high probability of relating to this object. However, vegetation might have similar colors at different heights, and thus the calculated distance from the camera may include some uncertainty, and even noise emanating from details and objects that are visible in one of the two images but not the other. The camera stores the calculated distance for each pixel in the group of pixels in the depth plane.

Step 840—using the calculated distance to determine a height above ground level (AGL) of the pixel group and comparing the height AGL with user set thresholds, which may be based on default thresholds included in the index. An embodiment may estimate a distance to the camera of the ground level by interpolating between the largest calculated distances to the camera, or by using a distance meter such as a laser rangefinder or a sonar to measure the ground's distance to the camera and interpolating between the largest measured ground distances. The group of pixels' height AGL is the group of pixels' distance from the camera subtracted from the estimated ground distance at the location of the group of pixels. The embodiment compares the height AGL with user-set and/or index-provided thresholds. For example, a user may have set a threshold indicating that only vegetation less than 2 meters AGL is relevant. This threshold excludes tall trees and other tall objects from being taken into consideration.

Step 850—determining if the group of pixels meets the criteria for height AGL, and if colors captured for the group of pixels meet a condition set in the index. Upon determining one of these is not the case, proceeding with Step 870, else proceeding with Step 860.

Step 860—upon determining that the group of pixels meets the criteria for height AGL and that the colors captured for the group of pixels meet a condition set in the index, tagging and storing the first image and sending an alert to the camera's user. A color meets a condition set in the index when the calculated index value exceeds a lower threshold value and does not exceed a higher threshold value. The alert may include information such as the first or second camera position, an alert type, an identification of the index (the camera may be using multiple indices simultaneously), visual information from a captured image, overlay information to show the exact position of the group of pixels that has caused the alert, a timestamp including the first time of capturing and/or the second time of capturing, and any other information relevant to the alert.

Step 870—determining if all pixel groups have been selected. If yes, repeating Step 810 through Step 850. If no, then repeating Step 830 through Step 850.

Although the description has been described with respect to particular embodiments thereof, these particular embodiments are merely illustrative, and not restrictive. For example, the method in FIG. 8 may be performed by a conventional camera as in FIG. 1, although it would lack the security required for a proprietary index. Also, a camera might be much more integrated than the one drawn in FIG. 6, and all electronics could be in a single semiconductor die.

Any suitable programming language can be used to implement the routines of particular embodiments including C, C++, Java, JavaScript, compiled languages, interpreted languages and scripts, assembly language, machine language, etc. Different programming techniques can be employed such as procedural or object oriented. Methods embodied in routines can execute on a single processor device or on a multiple processor system. Although the steps, operations, or computations may be presented in a specific order, this order may be changed in different particular embodiments. In some particular embodiments, multiple steps shown as sequential in this specification can be performed at the same time.

Particular embodiments may be implemented in a tangible, non-transitory computer-readable storage medium for use by or in connection with the instruction execution system, apparatus, board, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general-purpose digital computer, application-specific integrated circuits, programmable logic devices, field-programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A "computer" may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A camera comprising:
two or more color elements, each color element including a lens, a color filter, a filter data interface, and an image sensor;
a security processor including non-volatile memory (NVM) for externally inaccessible storing of a private key and firmware, and for storing at least one index;
a positioning receiver; and
a transceiver;
wherein the firmware includes instructions which, when executed, perform the following actions:
receiving and decrypting the index in the security processor; storing the decrypted index with limited external access in the NVM; obtaining a time and a date from the positioning receiver and determining if the time and the date meet a license term included in the index;
determining if installed color filters meet requirements included in the index;
upon determining that the time and the date meet the license term and the installed color filters meet the filter requirements included in the index, allowing usage of the index;
upon determining that the time and/or the date do not meet the license term, and/or the installed color filters do not meet the filter requirements included in the index, blocking usage of the index;
combining images obtained from the image sensors in the two or more color elements;
calculating an index value for pixels in a combined image;
determining if an alert must be issued; and
upon determining that the alert must be issued, issuing the alert to a user via the transceiver when a connection is available.

2. The camera of claim 1, wherein the security processor:
includes a non-volatile memory (NVM) for storing the private key, the firmware, and at least one decrypted index;
protects the private key from external reading and uses the private key to decrypt private messages and indices;
does not accept any command to directly read any NVM content externally;
does not allow direct access to any NVM content via any data pins, debug pins, and/or production test pins;

does not allow direct access to any NVM content via any bondpads, whether externally connected or not;

allows verification that a test code is correctly decoded; and allows updating the firmware only if replacement firmware is encrypted and authenticated.

3. The camera of claim 1, wherein a color filter with a filter data interface is removable and/or replaceable.

4. The camera of claim 1, wherein a color element is removable and/or replaceable.

5. The camera of claim 1, wherein a color element further includes a local processor and a local memory.

6. The camera of claim 1, wherein the positioning receiver determines a position according to at least one of:
global positioning system (GPS),
global navigation satellite system (GLONASS),
Galileo,
Beidou, or
an earth-based positioning system.

7. The camera of claim 1, wherein the transceiver handles wireless and/or wired communication between the camera and the user.

8. The camera of claim 1, wherein the firmware accepts a command to store or remove an index, but not a command to read a secret section of an index.

9. The camera of claim 1, further comprising a distance meter.

10. The camera of claim 1, wherein the private key is associated with a public key in an asymmetric encryption system, and the public key is associated with a camera serial number.

11. The camera of claim 5, wherein the filter requirements comprise a filter identification and/or a filter specification.

12. The camera of claim 5, wherein the filter data interface is configured to provide a filter identification and/or a filter specification.

13. The camera of claim 12, wherein the filter data interface uses an electromagnetic field to communicate the filter identification and/or the filter specification.

14. The camera of claim 5, wherein determining if the alert must be issued is performed by calculating an index value and comparing it with a threshold.

15. The camera of claim 5, wherein the actions further comprise:
capturing a first image and a second image;
capturing a first camera position related to the first image and a second camera position related to the second image;
determining a motion distance and motion direction between the first camera position and the second camera position;
selecting a group of adjacent pixels with similar colors in the first image, and finding a two-dimensional shift of the group of pixels by correlating pixel colors in the second image with pixel colors in the first image;
calculating a pixel group distance from the camera based on a result of correlating the pixel colors and based on the motion distance;
calculating a pixel group height above ground level (AGL) by subtracting the pixel group distance from the camera from a camera height AGL;
determining if the pixel group height AGL meets a height condition and if an index value meets an index value condition; and
upon determining that the pixel group height AGL meets the height condition and that the index value meets the index value condition, tagging and storing the first image and/or the second image and issuing an alert when the connection is available.

16. A security processor with a non-transitory memory comprising firmware with instructions which, when executed, perform the following actions:
receiving and decrypting an index in the security processor;
storing the decrypted index with limited external access in a non-volatile memory (NVM),
obtaining a time and a date from a positioning receiver and determining if the time and the date meet a license term included in the index;
determining it installed color filters meet requirements included in the index;
upon determining that the time and the date meet the license term and the installed color filters meet the filter requirements included in the index, allowing usage of the index;
upon determining that the time and/or the date do not meet the license term, and/or the installed color filters do not meet the filter requirements included in the index, blocking usage of the index;
combining images obtained from two or more image sensors;
calculating an index value for pixels in a combined image;
based on the index value, determining if an alert must be issued; and
upon determining that the alert must be issued, issuing the alert to a user via a transceiver when a connection is available.

* * * * *